Nov. 24, 1953  E. BOHNET  2,659,979
INDICATING DEVICE
Filed July 17, 1950
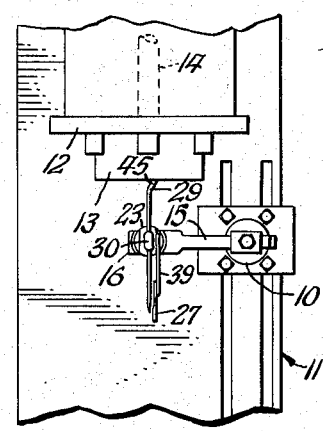
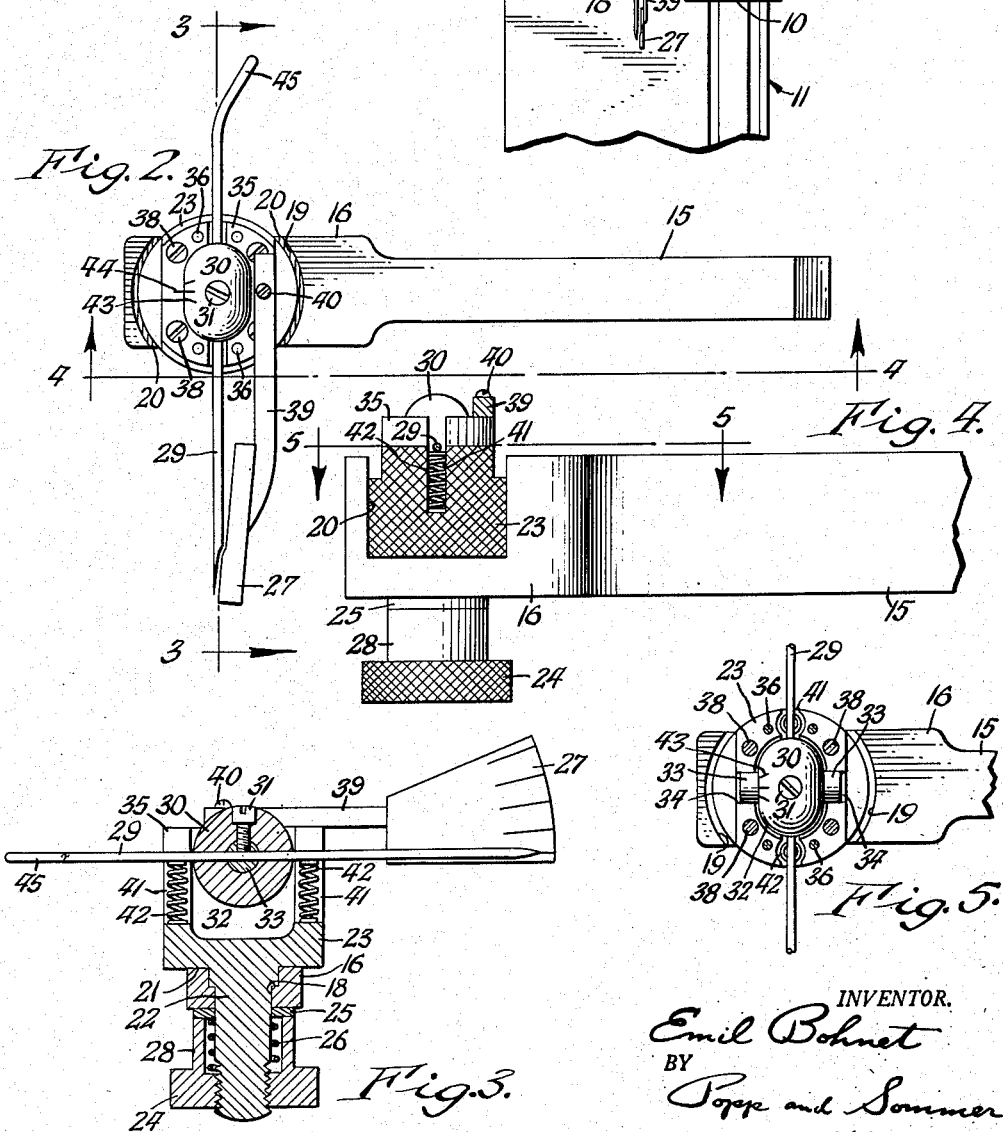
INVENTOR.
Emil Bohnet
BY
Popp and Sommer
Attorneys.

Patented Nov. 24, 1953

2,659,979

UNITED STATES PATENT OFFICE 2,659,979

INDICATING DEVICE

Emil Bohnet, Buffalo, N. Y.

Application July 17, 1950, Serial No. 174,288

4 Claims. (Cl. 33—172)

This invention relates to indicating devices and more particularly to an indicator for determining the eccentricity of a cylindrical surface of a workpiece mounted in a lathe, boring or milling machine or the like so that adjustment of the chuck can be made to bring the axis of such cylindrical surface into coincidence with the axis of the rotatable chuck.

The primary object of the present invention is to provide such an eccentricity indicator for centering the workpiece or either an internal or external surface thereon with respect to the axis of rotation of the chuck holding the workpiece.

Another object is to provide such an eccentricity indicator which indicates the degree of eccentricity and therefore indicates the degree of adjustment of the chuck in order to render the workpiece concentric.

Another object is to provide such an eccentricity indicator which can be supported at any desired angle within a wide range with respect to the workpiece and also with respect to the part of the machine holding the indicator such as a tool post on a lathe.

A further object is to provide such an eccentricity indicator which is simple in construction, reliable and efficient in operation, easily read and very sensitive in action and also may be manufactured at low cost.

Other objects and advantages of the invention will be apparent from the following description and accompanying drawings in which:

Fig. 1 is a fragmentary plan view of a lathe showing an eccentricity indicator embodying the present invention mounted thereon.

Fig. 2 is a top plan view on a greatly enlarged scale of the eccentricity indicator shown in Fig. 1.

Fig. 3 is a vertical transverse sectional view thereof taken on line 3—3, Fig. 2.

Fig. 4 is a vertical longitudinal sectional view thereof taken on line 4—4, Fig. 2.

Fig. 5 is a fragmentary horizontal sectional view thereof taken on line 5—5, Fig. 4.

Referring to Fig. 1, the eccentricity indicator embodying the present invention is shown, for illustrative purposes only, as mounted in the conventional tool post 10 of a lathe indicated generally at 11. The lathe 11 is shown as having a chuck 12 holding a workpiece 13. The eccentricity indicator is set up for determining the eccentricity of an internal cylindrical surface on the workpiece 13 so that the chuck 12 can be adjusted to hold this surface with its axis concentric with that of the head stock spindle 14.

The indicator comprises a body formed to provide a bar 15 adapted to be clamped in the usual tool post 10. One end of this bar 15 enlarges into an integral head 16 which is shown as having a bore 18 extending vertically therethrough. The upper portion of this bore 18 is enlarged as indicated at 19 to a diameter greater than the width of the head 16 so as to provide side openings 20, 20 on opposite sides of the head 16 and also an upwardly facing surface 21, at the upper end of the lower narrow part of the bore 18 and surrounding the same.

A bolt member 22 is shown as having its shank journaled in the lower narrow part of the bore 18 for rotation relative to the head 16. The upper end of the bolt member 22 is shown as formed to provide an enlarged cylindrical integral head 23 having its lower surface seating on the surface 21 and its upper surface on about the same level as the upper surface of the head 16. The diameter of the head 23 is greater than the width of the head 16 so that portions of the head 23 extends outwardly through the side openings 20. The periphery of the head 23 is preferably knurled as shown so as to permit it to be grasped for turning the same relative to the stationary head 16.

The bolt member 22 is arranged for angular adjustment relative to the head 16 about a vertical axis and means are provided for permitting and maintaining the desired adjustment. Such means are shown as comprising a nut member 24, washer 25 and spring 26. The washer 25 surrounds the shank of the bolt member 22 and bears against the bottom flat surface of the head 16. The nut member 24 works on the externally threaded lower end of the shank of the bolt member 22. The spring 26 is of helical form and surrounds the shank of the bolt member 22 and its upper end bears against the bottom of the washer 25 and its lower end bears against the nut member 24. This nut member 24 is also shown as formed with an upstanding cylindrical tubular neck 28 which surrounds the spring 26 and the upper end of this neck is adapted to engage the bottom of the washer 25.

It will thus be seen that with the nut member 24 tightened down against the washer 25, the head 23 of the bolt member 22 is clamped against the surface 21 of the head 16 and this bolt member is prevented from turning relative to the head 16. However, loosening the nut member 24 permits the bolt member 22 to be turned to any angular position relative to the head 16, the spring 26 serving to hold the lower surface 24 of the head 23 in engagement with the surface 21 of the head 16 while the nut member 24 is so loosened. The periphery of the nut member 24 is preferably knurled as shown to permit of its readily being turned.

The head 23 of the bolt member 22 is arranged to movably hold a rod or needle 29 one end of which is adapted to engage the workpiece 13 and the other end of which is adapted to traverse a scale 27 thereby to indicate the degree of eccentricity. As shown, the rod or needle 29 extends through a horizontal hole in a ball-shaped holder 30 and is held in place by a set screw 31. This holder 30 is partially arranged in an upwardly opening recess 32 in the enlarged head 23 of the bolt member 22 and is pivotally mounted on the side wall of this head. As best shown in Fig. 5 a pair of trunnion pins 33, 33 extend coaxially laterally from the holder 30 at right angles to the longitudinal axis of the rod or needle 29. These trunnion pins 33 are journaled in semi-circular bearing recesses 34, 34 formed in the rim of the head 23. Each of the top halves of these trunnion pins 33 is held in place by an arcuate bearing cap 35 which is seated on the rim of the head 23 and centered thereon by dowel pins 36 and held in place by screws 38.

The scale 27 is connected to the outer end of a horizontal arm 39 which is mounted on one of the bearing caps 35 and secured thereto by a screw 40.

The rod or needle 29 is normally held in a horizontal position or in a position extending at right angles to the axis of the bolt member 22. For this purpose, the side wall of the head 23 of the bolt member 22 is slotted on opposite sides thereof underneath the rod or needle 29 as indicated at 41. Both these vertical slots 41 are of the same depth and in each is arranged a helical compression spring 42 having its lower end seating on the bottom of the respective slot and its upper end bearing against the rod or needle 29. The slots 41 are preferable substantially circular in cross section so as to confine the springs 42 therewithin.

The springs 42 are identical in size and shape so as to exert the same force against the rod or needle 29 when the latter is in a horizontal position as shown in Fig. 3, these springs being under a slight amount of compression when in this position. Since these springs engage the rod or needle 29 at the same distance from the axis of rotation of the trunnion pins 33, equal but oppositely directed torques are applied and the rod or needle is maintained in a centered horizontal position. As well as this centered position being indicated by one end of the rod or needle 29 being opposite a particular graduation on the scale 27, a scale 43 can be provided on the upper surface of the holder 30 and adapted to traverse a reference line 44 on the adjacent upper surface of the adjacent bearing cap 35.

It will be seen that the rod or needle 29 can be placed at any desired angle relative to the head 16 within the range determined by the horizontal distance between the vertical side edges of one of the openings 29.

Also different shapes of rods or needles 29 can be used. If an internal cylindrical surface is to be checked for eccentricity as shown, the end of the rod or needle 29 which is adapted to engage the workpiece is turned or bent as indicated at 45. The end 45 is then placed inside the workpiece and brought in contact with the internal surface to be tested. If this surface is eccentric with respect to the axis of the head stock spindle the rod or needle 29 will oscillate up and down, thereby indicating through the graduations on the scale 27 the degree of eccentricity.

If a straight rod or needle is used the end of it may be placed in the center punch mark of the workpiece. If this punch mark is out of center the rod or needle wabbles to show such eccentricity.

If the eccentricity of the outside diameter of a workpiece is to be checked, the end of the rod or needle is placed against the external surface of the workpiece while revolving the latter and eccentricity of such surface will likewise be indicated by fluctuations of the rod or needle.

From the foregoing it will be seen that the present invention provides a versatile, simple, sturdy, easily usable and sensitive eccentricity indicator.

I claim:

1. An eccentricity indicator, comprising a body having a bar for holding the indicator and a head at one end of said bar, said head being provided with a bore extending therethrough and one end of said bore being enlarged to a diameter greater than the width of said head so as to provide side openings on opposite sides of said head, a bolt member journaled in said bore and having an enlarged head at one end arranged within said enlarged portion of said bore and projecting through said openings, means arranged to maintain the angular adjustment of said bolt member relative to said head, said head of said bolt member being provided with a recess opening to one axially facing side thereof to provide an annular wall, a holder arranged in said recess and journaled on said annular wall for pivotal action about an axis extending at right angles to the axis of said bore, a rod mounted on said holder and extending laterally therefrom, the outer end of said rod being adapted to engage a surface the eccentricity of which is to be checked, and a spring arranged in an axially extending slot in said annular wall on opposite sides of the pivotal axis of said holder and bearing against said rod to urge said rod to a normal centered position, said rod being adapted to enter said slots.

2. An eccentricity indicator, comprising a body having a bar for holding the indicator and a head at one end of said bar, said head being provided with a bore extending therethrough and one end of said bore being enlarged to a diameter greater than the width of said head so as to provide side openings on opposite sides of said head, a bolt member journaled in said bore and having an enlarged head at one end arranged within said enlarged portion of said bore and projecting through said openings, means arranged to maintain the angular adjustment of said bolt member relative to said head, a holder, trunnion pins extending coaxially laterally from opposite sides of said holder, said head of said bolt member having semi-circular bearing recesses receiving said trunnion pins, the axis of said bearing recesses extending at right angles to the axis of said bore, a pair of bearing caps arranged on said head of said bolt member one over each of said trunnion pins and each having a semi-circular bearing recess receiving the corresponding one of said trunnion pins, a rod mounted on said holder and extending laterally therefrom at right angles to the axis of said trunnion pins, the outer end of said rod being adapted to engage a surface the eccentricity of which is to be checked, and yielding means on opposite sides of said axis of said trunnion pins and operatively interposed between said rod and said head of said bolt member and arranged to urge said rod to a normal centered position.

3. An eccentricity indicator, comprising a body having a bar for holding the indicator and a head at one end of said bar, said head being provided with a bore extending therethrough and one end of said bore being enlarged to a diameter greater than the width of said head so as to provide side openings on opposite sides of said head, a seat on said head and surrounding said bore and facing said enlarged portion of said bore, a bolt member journaled in said bore and having an enlarged head at one end arranged within said enlarged portion of said bore and projecting through said openings, and also having a part engaging said seat, means arranged to clamp said part of said bolt member against said seat for maintaining the angular adjustment of said bolt member relative to said head and including a nut member having an adjustable threaded engagement with said bolt member and arranged for thrust engagement with said head of said body, a washer surrounding said bolt member and arranged between said head of said body and said nut member and a spring arranged between said washer and said nut member, a holder, trunnion pins extending coaxially laterally from opposite sides of said holder, said head of said bolt member having semi-circular bearing recesses receiving said trunnion pins, the axis of said bearing recesses extending at right angles to the axis of said bore, a pair of bearing caps arranged on said head of said bolt member one over each of said trunnion pins and each having a semi-circular bearing recess receiving the corresponding one of said trunnion pins, a rod mounted on said holder and extending laterally therefrom at right angles to the axis of said trunnion pins, the outer end of said rod being adapted to engage a surface the eccentricity of which is to be checked, and a spring on opposite sides of said axis of said trunnion pins and operatively interposed between said rod and said head of said bolt member and arranged to urge said rod to a normal centered position.

4. An eccentricity indicator, comprising a support bar, a bolt member rotatably mounted on said bar at one end thereof, means arranged to maintain the angular adjustment of said bolt member relative to said bar, said bolt member having an enlarged head which is provided with a recess opening to one axially facing side thereof to provide an annular wall, a holder arranged in said recess and journaled on said annular wall for pivotal action about an axis extending at right angles to the axis about which said bolt member is rotatable, a rod mounted on said holder and extending laterally therefrom, the outer end of said rod being adapted to engage a surface the eccentricity of which is to be checked, and a spring arranged in an axially extending slot in said annular wall on opposite sides of the pivotal axis of said holder and bearing against said rod to urge said rod to a normal centered position, said rod being adapted to enter said slots.

EMIL BOHNET.

References Cited in the file of this patent

UNITED STATES PATENTS

| Number | Name | Date |
| --- | --- | --- |
| 617,501 | Fay | Jan. 10, 1899 |
| 773,425 | Riggs et al. | Oct. 25, 1904 |
| 1,648,428 | Stacy | Nov. 8, 1927 |
| 1,660,986 | Berlowitz | Feb. 28, 1928 |
| 1,936,160 | George | Nov. 21, 1933 |
| 2,150,577 | Bernhardt | Mar. 14, 1939 |